United States Patent [19]
Norris

[11] Patent Number: 5,409,238
[45] Date of Patent: Apr. 25, 1995

[54] TARGET PRACTICE DEVICE

[76] Inventor: Wilbur D. Norris, P.O. Box 1508 140 Dr. Corbett Rd., Swansboro, N.C. 28584

[21] Appl. No.: 101,319

[22] Filed: Aug. 3, 1993

[51] Int. Cl.⁶ .............................................. F41J 7/04
[52] U.S. Cl. ....................................... 273/392; 464/33
[58] Field of Search ........................ 273/390, 391, 392; 464/32, 33; 403/2; 33/DIG. 14

[56] References Cited

U.S. PATENT DOCUMENTS

| | | | |
|---|---|---|---|
| 1,685,098 | 9/1928 | Sklovsky | 464/33 |
| 1,796,803 | 3/1931 | Nelson | 464/33 |
| 3,071,945 | 1/1963 | Shomo | 464/33 |
| 4,732,394 | 5/1988 | Stein | 273/391 |
| 4,739,996 | 4/1988 | Vedder | 273/392 |

Primary Examiner—William H. Grieb
Attorney, Agent, or Firm—Pollock, Vande Sande & Priddy

[57] ABSTRACT

The present invention target practice device is fitted with a hub which, together with a malleable key, pivotally drives a holder upon which a target is mounted to at least two positions—a lay down position and a pop-up position. The malleable key has a composition that is sufficiently strong to enable the drive shaft of the motor to pivotally drive the holder, and yet be sufficiently weak to be sheared at a predetermined torque. Thus, if the target practice device enters into a "fail mode", instead of causing the drive motor to jam up and to thereby expose the target practice device to potential harm, the key is sheared off so that no damaging load is placed on the drive shaft of the drive motor.

22 Claims, 4 Drawing Sheets

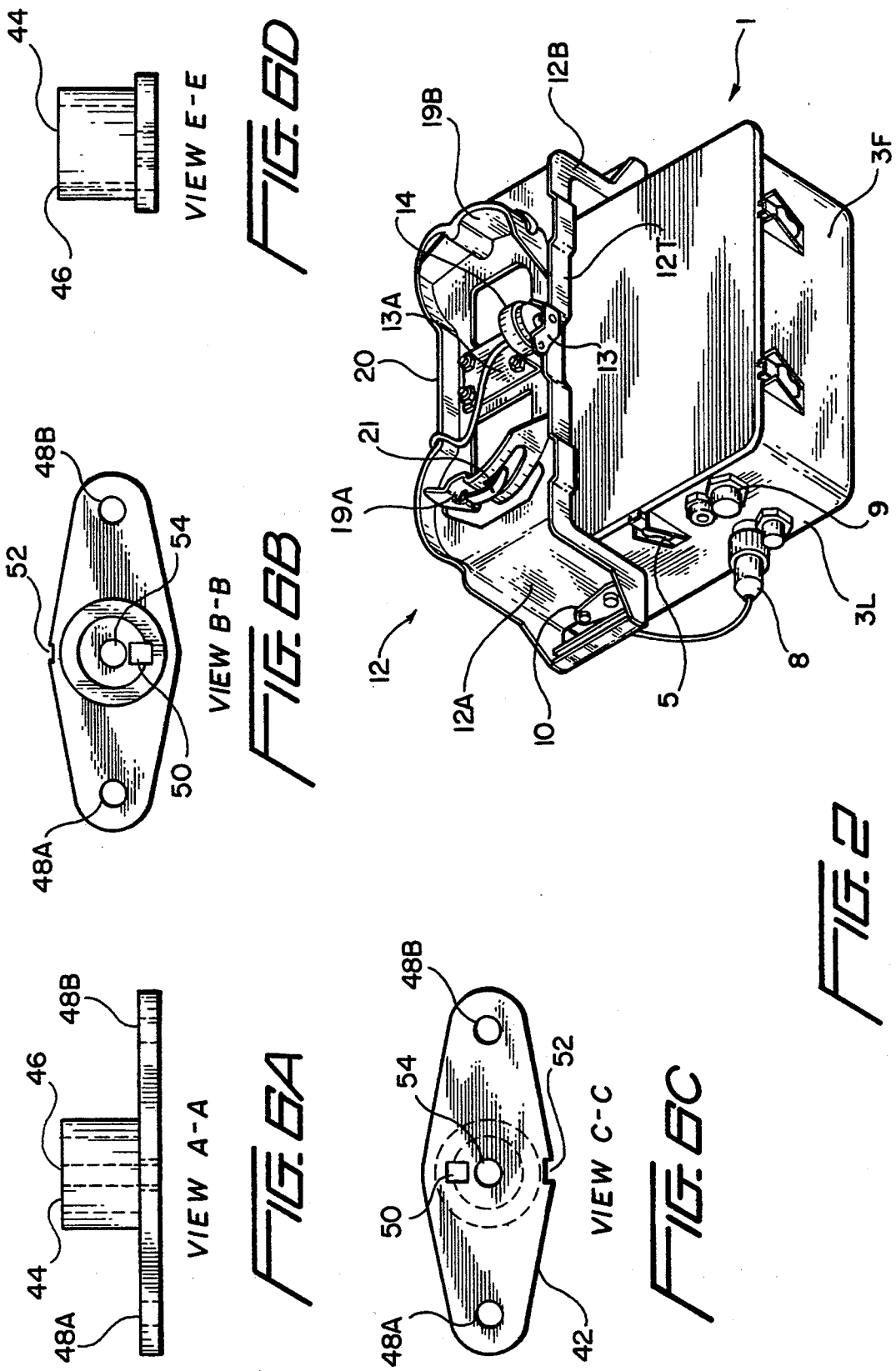

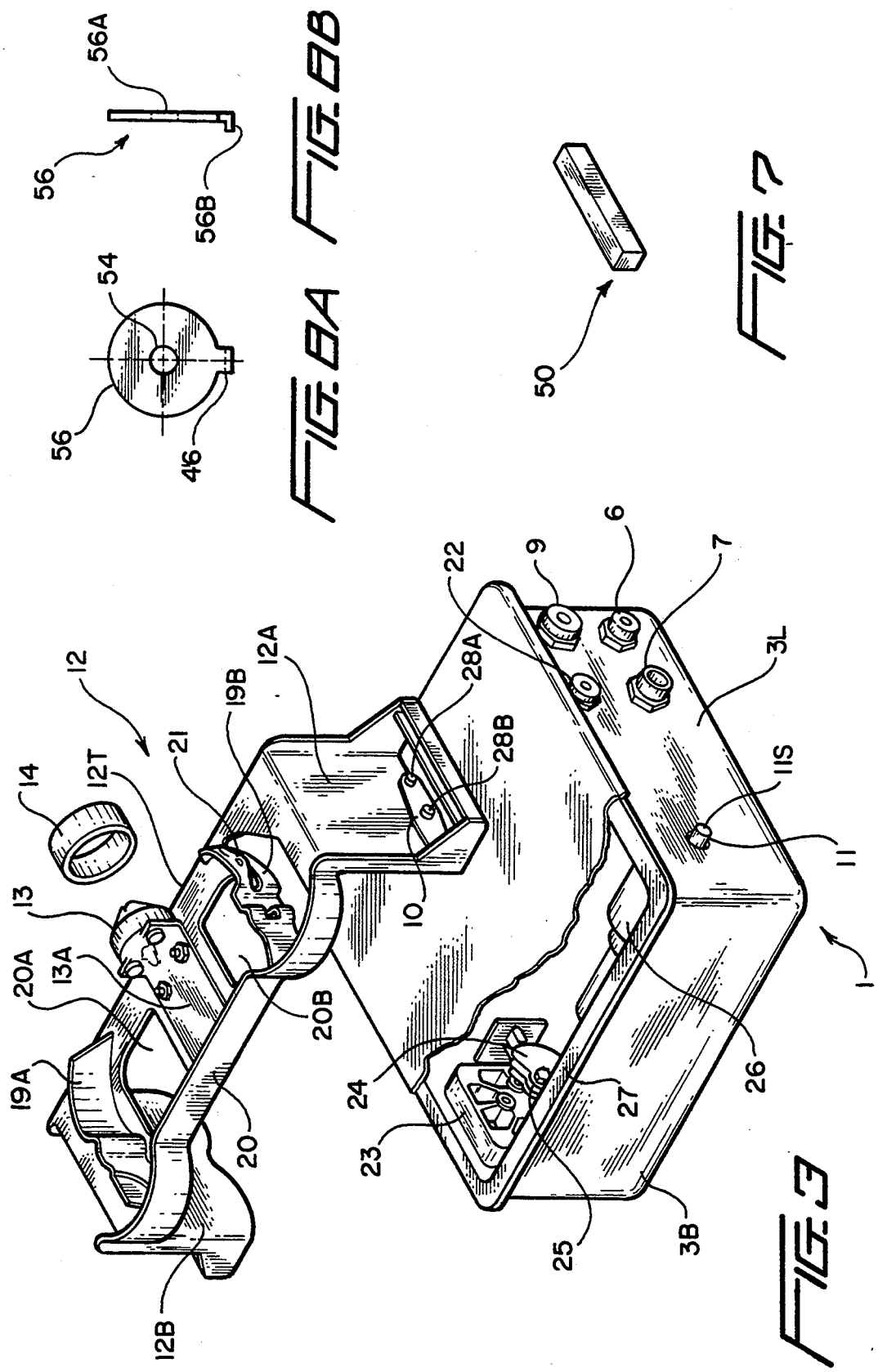

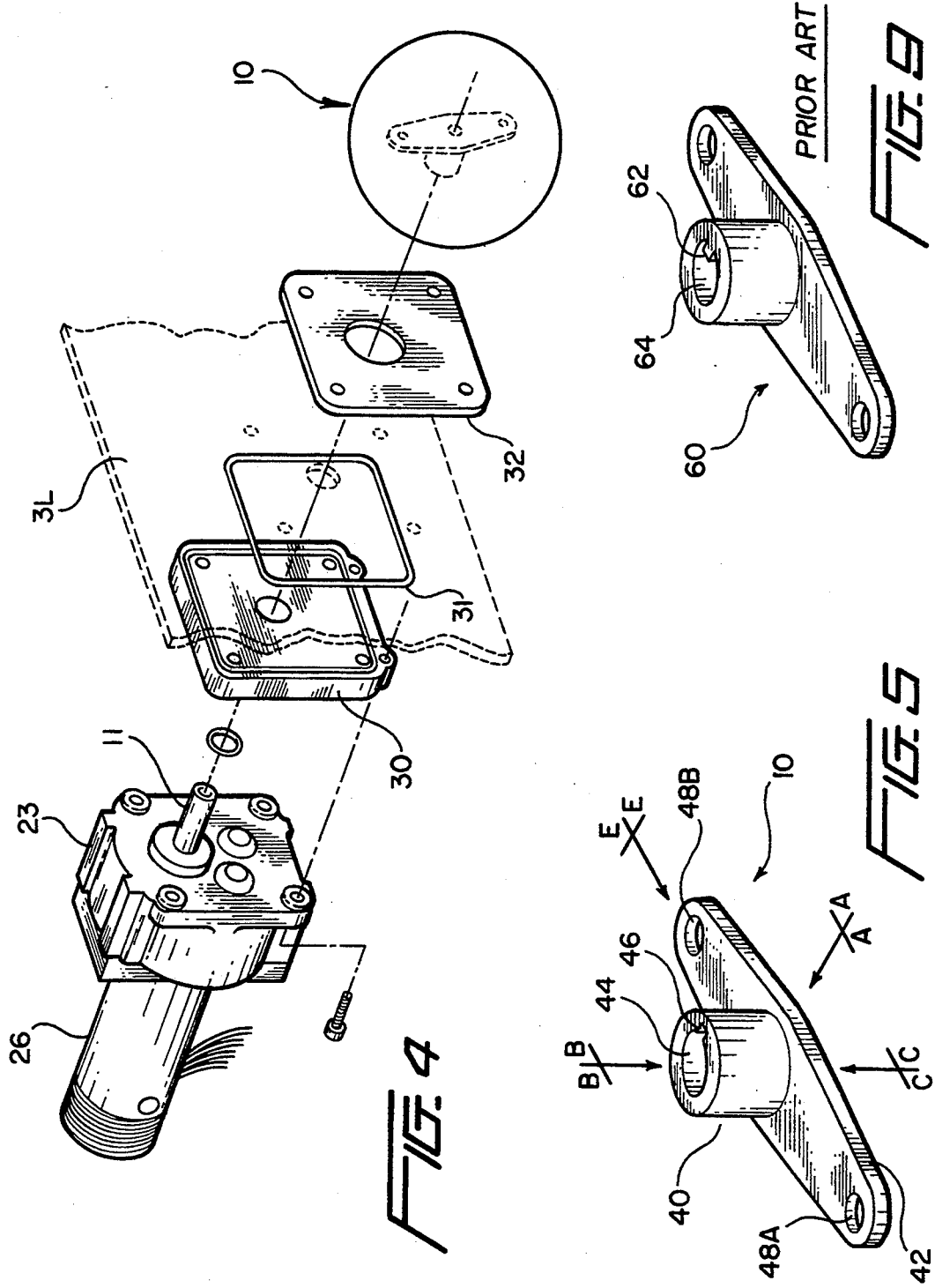

TARGET PRACTICE DEVICE

FIELD OF THE INVENTION

The present invention relates to target practice devices and particularly to a target practice device that is easily repairable and whose electronics and motor would not be extensively damaged during "fail mode".

BACKGROUND OF THE INVENTION

Target practice devices are widely used by the armed services. Conventionally, target practice equipment are located at all rifle ranges and target ground to enable markspersons to practice their aim. One of the interest target practice devices being used by all of the branches of the armed services is a device having model number NSN 6920-01-142-2858. In particular, this device pivots a target to a "pop-up" position so that it may be shot at. The hitting of the target is sensed by the device, which then activates its motor to pivot the target to a "lay down" position. The target is therefore pivotable to either a pop-up or lay down position.

When the sensor which senses the movement of the target between the two positions is non-operationable, the motor tends to continue to drive the target beyond either 0° or 90° for the respective lay down or pop-up positions into a "fail mode". In fact, oftentimes the target is driven beyond the pop-up position to end up being jammed against the top of the equipment, with the drive shaft of the motor continuing its rotation. When thus jammed, a high torque results at the drive shaft. Not only could such high torque then cause the motor to burn out at that time, but also the electronic components within the equipment could be damaged due to potential surges of electrical current caused by the jammed device. Needless to say, the costs, which entail the removal of the device from service, the replacement of the damaged electronic components and motor, and the reinstallation of the equipment to the rifle range, are fairly high for each malfunctioned target practice device.

An improvement to the target practice device is therefore needed to prevent the target practice device from being extensively damaged when it does go into the "fail mode".

BRIEF DESCRIPTION OF THE PRESENT INVENTION

To prevent damage to the electronic components and the motor, the present invention target practice device utilizes a hub having a groove for connecting the drive shaft of the motor to the holder to which the target is mounted. A spline key (pin) which, per alternate embodiments is comprised of for example lead or zinc respectively combined with traces of other materials, is inserted into the aperture created from the alignment of the groove in the hub to the corresponding slot in the shaft. The spline key is manufactured to be able to withstand a torque below a predetermined amount such that it acts as a coupler to cause the drive shaft and the hub to act as a unit when the torque is below the predetermined amount. Thus, when the target practice device is operating correctly, the holder is pivoted between the lay down and pop-up positions by the rotation of the drive shaft.

With the present invention, when the target practice device malfunctions and the predetermined torque is reached, the spline key is sheared such that, even though the holder would remain fixed at a particular position, the drive shaft would freely rotate, thereby relieving the load at the motor, and thus preventing the windings of the motor from burning out and electrical spikes from potentially damaging the electronic components resident in the target practice device.

Inasmuch as the spline key is comparatively cheap and easily replaceable, the cost of maintaining an operational target practice device is greatly reduced. Further, insofar as it is readily replaceable, the target practice device down time is greatly reduced.

BRIEF DESCRIPTION OF THE FIGURES

FIG. 2 is a perspective view of the FIG. 1 target practice device with its holder in an upright position;

FIG. 3 is a semi-exploded perspective view of the FIG. 1 target practice device with its top cover partially cut to expose the driving motor;

FIG. 4 is an exploded view of the motor shown in relationship to the coupling of the hub of the instant invention to the drive shaft of the motor;

FIG. 5 is a perspective view of the hub of the instant invention;

FIG. 6A is view A—A of the FIG. 5 hub;
FIG. 6B is view B—B of the FIG. 5 hub;
FIG. 6C is view C—C of the FIG. 5 hub;
FIG. 6D is view E—E of the FIG. 5 hub;

FIG. 7 is a perspective view of a spline key for coupling the FIG. 5 hub to the drive shaft of the FIG. 4 motor;

FIG. 8A is a plan view of a washer to be used with the FIG. 5 hub;

FIG. 8B is a side view of the FIG. 8 washer; and

FIG. 9 is a prior art hub used in the target practice device.

DETAILED DESCRIPTION OF THE PRESENT INVENTION

Figure 1:
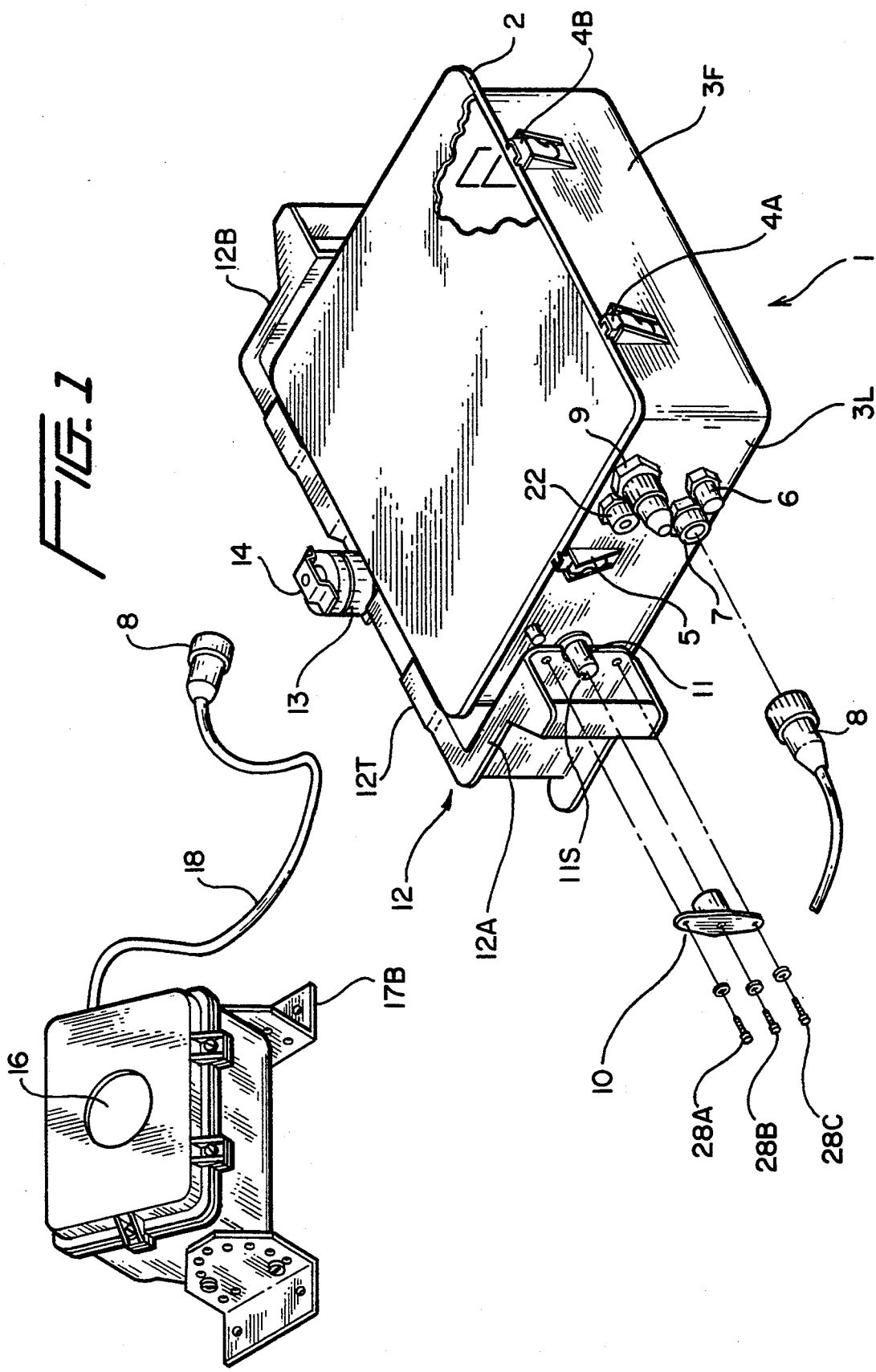
FIG. 1 is a perspective view of a target practice device incorporating the improvement of the instant invention.

With reference to FIGS. 1-3, a target practice device is shown to have a container 1 having a cover 2 placed over its lip 27. Cover 2 is secured to container 1 by means of latches 4A, 4B, 5 and other similar securing means. A holder 12, in the form of a bracket having legs 12A and 12B, is pivotally connected to container 1 by means of a drive shaft 11 of a motor 26 and a hub 10. In FIG. 1, holder 12 is shown to be pivoted to a lay down position; while in FIG. 2, holder 12 is shown to be pivoted to an upright "pop-up" position.

As more clearly shown in FIG. 2, holder 12 has clasps 19A and 19B for securing a target, as for example a plastic board cut out of a sniper or a soldier. As shown more clearly in FIGS. 2 and 3, there is bolted to holder 12 via a flange 13A a sensor 13, protected by a cover 14. Sensor 13 is a conventional motion detecting type sensor which, upon sensing a hit on the target, sends a signal to the electronic components (not shown for the sake of simplicity) inside container 1 for registering the hit. The signal can then be sent to a remote location, for example a command center at which the instructors and/or observers are located, for recording the accuracy of the shot.

A number of input/output connectors 6, 7, 22 and 9 are provided at side 3L of container 1 for receiving/transmitting command result signals to the aforesaid locations. Furthermore, one of the connectors, for example 9, is used for mating with an illumination unit 15, set, per brackets 17A and 17B, at a location in front of the target practice device so as to coordinate a reflecting light onto the target to simulate the firing of a weapon from the target. The light, which may be in the form of a laser, is provided by illumination unit 15 through window 16 to impinge directly onto the target mounted to holder 12.

Holder 12 is driven by motor 26, per its drive shaft 11. To enable holder 12 to be driven by motor 26, as shown in FIG. 1 and more clearly in FIG. 4, leg 12A of holder 12 is mated to shaft 11 and fixedly coupled thereto by hub 10.

Prior to the instant invention, the drive hub used with the target practice device is configured as shown in FIG. 9. There, prior art hub 60 is a single piece molded unit with an extension 62 lengthwise along a portion of the interior circumference of hole 64 to secure holder 12 to drive shaft 11. With reference to the present invention hub 10 shown in FIGS. 1-3, after holder 12 has been positioned relative to drive shaft 11 (with a corresponding idle shaft extending from gear box 23 fitted to leg 12B of holder), hub 60 is inserted to drive shaft 11 with extension 62 fitted within a slot 11S of drive shaft 11. Thereafter, hub 60 is secured to leg 12A of holder 12 by means of screws or bolts 28A, 28B and 28C.

In operation, upon receiving a signal from the command center, motor 26 is activated to rotate drive shaft 11, to thereby pivot holder 12 between the lay down position and the pop-up position. To be effective, holder 12, at the pop-up position, has to be pivoted approximately 90° from the lay down position so as to set the target in an upright position. The sensing of this upright position can be done, for example, by a sensor located at 24 or an encoder measuring the rotation of the drive shaft of motor 26. Sensor 24 can be a mechanical sensor, in the form of cams and gears, or a conventional electrical sensor sensing the location of holder 12. A timer may also be used to provide a signal to activate a relay (not shown) for activating motor 26 for a specific period of time to pivot holder 12 to the upright pop-up position.

However, because of the environment in which the target practice device is used, oftentimes the sensor (or encoder or counter) may malfunction to thereby effectively place the target practice device in the "fail mode". In such "fail mode", holder 12 would fail to stop at the upright 90° position. Instead, it would continue to rotate until the target mounted thereto hits cover 12 of container 1, as it continues to be pivoted in the direction toward face 3F of the device. In this circumstance, motor 26 continues to be energized, and drive shaft 11 continues to rotate. But inasmuch as the target, and therefore holder 12, is jammed while drive shaft 11 continues to attempt to rotate, a large torque is built up by motor 26. If unchecked, motor 26 will malfunction as its windings burn up. Moreover, current surges, resulting from a jammed motor, could also damage the electronic components mounted to circuit boards within the target practice device. Once the windings in motor 26 are burned, needless to say, the cost of repairing the target practice device, both in terms of the replacement of the motor and the electronic components and the time for the technician to perform the replacement, is quite expensive.

With reference to FIGS. 5 and 6, the present invention improvement to the target practice device utilizes a new type of hub 10 having a groove 46 formed longitudinally along a section of the inner circumference of body 40. Like the prior art hub 60, a flat portion 42 having two holes 48A and 48B formed at its respective ends extends perpendicularly from body 40. Groove 46 is formed in correspondence to slot 11S machined in drive shaft 11 so that when hub 10 is fitted about drive shaft 11 and groove 46 aligned with slot 11S, an aperture is formed by the combination of slot 11S and groove 46.

FIG. 7 shows in perspective view a spline key (or pin) 50 to be fitted within the aperture formed by aligned slot 11S and groove 46. Spline key 50 is manufactured to have the property of being sheared at a given torque, such that, when that given torque is exceeded, it is sheared to allow drive shaft 11 to freely rotate irrespective of the positioning of holder 12.

Thus, as shown in FIG. 4, drive shaft 11 extends from motor 23 beyond face 3L of container 1 of the target practice device, and further extending through bracket 30, gasket 31 and plate 32. Upon mating leg 12A of holder 12 to drive shaft 11, hub 10 is fitted about drive shaft 11 and positioned such that groove 46 is aligned with slot 11S of drive shaft 11. Thereafter, spline key 50 is inserted into the aperture formed by the aligned slot 11S and groove 46. At the same time, hub 10 is fixedly bolted to leg 12A of holder 12 by means of screws 28A, 28B and 28C.

To prevent screw 28B from coming loose, a locking washer 56, shown in FIGS. 8A and 8B, is used. As shown thereat, washer 56 has a tab 46 and is fitted at the back plate of hub 10, per view C—C in FIG. 6C. As tab 46 is fitted into slot 52 of hub 10 and is therefore prevented from rotation, screw 28B is prevented from coming loose. Of course, locking washers are also used with the different screws 28A–28C to further prevent the loosening of hub 10 from leg 12A.

Spline key 50 is formed of a combination of materials such that, given a particular dimensional target, it will shear if a predetermined torque is reached. For the instant invention, by empirical studies, given a conventional target that weighs approximately 12 lbs. and has a dimension of approximately 42" tall and 24" wide, the inventor has found that a torque at drive shaft 11 of approximately of 44 lbs. would potentially cause damage to both motor 26 and the electronic components residing within the target practice device. Accordingly, for the instant invention, a predetermined torque set at approximately 40–50 lbs., and preferably set more precisely at 44 lbs., is used as the shear guideline for the manufacture of the spline key. Of course, it is imperative to note the predetermined torque could be varied in accordance with different types of motors. Thus, the above-mentioned 40–50 lbs. torque is but an exemplar torque for a particular type of motor having connected thereto a particular dimensioned target. For the instant discussion, however, the predetermined torque is presumed to be of approximately 40–50 lbs.

One of the factors that may cause potential damage is the number of hits a target has sustained. To elaborate, presuppose a target is capable of sustaining 300 hits (holes) before it needs to be replaced. Yet as the number of hits accumulated, since there is less resistance and less weight due to the many holes, the target tends to move between the pop-up and lay-down positions more quickly. Eventually, the total number of holes collected by the target would cause the target to be pivoted at a sufficiently fast velocity so as to jam it against face 3F of the device into the "fail mode", as discussed earlier, with the motor continuing to rotate at the above-mentioned torque.

To provide it with the property of being sheared at the aforenoted predetermined torque, spline key 50 is formed from the following materials: lead, antimony, arsenic, bismuth, silver, iron, cadmium and nickel. With respect to the percentages of the various materials, the inventor has found that key 50 may have a lead content of at least about 95%, an antimony content to be about 0.45% to about 1.15%, a silver content to be about 0.42% to about 0.68%, and a nickel content to be about 0.20% to about 1.0%. In particular, the composition of the different materials of an exemplar spline key 50 having the following percentages was found to be quite effective: lead (97%–98%), antimony (0.55%–1.05%), arsenic (0.022%–0.14%), bismuth (0.007%–0.13%), silver (0.52%–0.58%), iron (0.03%–0.68%), cadmium (0.011%–0.08%), and nickel (0.30%–0.90%). Of course, it should be appreciated that the above composition of materials is with reference to a conventional target used with the aforementioned conventional target practice device. Thus, if the size and/or weight of the target is varied, the predetermined torque could very well be different, and the composition of the spline key need to be reconfigured. For example, an alternative embodiment envisions a spline key comprising the following composition of materials:

| MATERIAL | | COMPOSITION |
| --- | --- | --- |
| Zinc | about | 94%–98% |
| Antimony | about | .55%–1.05% |
| Arsenic | about | .022%–.14% |
| Bismuth | about | .007%–.13% |
| Silver | about | .52%–.58% |
| Iron | about | .03%–.68% |
| Cadmium | about | .011%–.08% |
| Nickel | about | .30%–.90% |
| Aluminum | about | .01%–4.00% |

Such a composition is known commonly as an 7000 Series Alloy by Industry Standards.

With the thus described spine key 50 inserted to the aperture formed by the aligned slot 11S and groove 46, the target practice device of the instant invention, upon receiving a control or command signal, would activate motor 26 to thereby pivot holder 12 between the lay down and pop-up positions. And in the instance where something becomes amiss with the device, as for example when the sensor at 24 becomes inoperative and holder 12 continues to be pivoted in the direction toward face 3F of the container, after a certain period of time when the predetermined torque, for example at 44 lbs., is reached, key 50 is sheared so that drive shaft 11 becomes free wheeling. And as long as no load is placed against drive shaft 11, motor 26 is not in danger of having its windings burned-out. Also, insofar as drive shaft 11 is able to rotate freely, current would not back-flow into the electronic components of the target practice device. Thus, instead of having to replace the motor and/or electronic components, the repair person only needs to replace the spline key 50 and the defective component, as for example the sensor at 24. Substantial costs are thereby saved.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

I claim:

1. Target practice device comprising:

a target;

a pivotable holder to which said target is mounted;

motor means;

couple means for releasably coupling said holder to said motor means;

wherein said motor means is responsive to a control signal for pivotally driving said holder between at least two positions; and wherein said couple means is responsive to a predetermined torque reached by said motor means for decoupling said holder from said motor means to thereby prevent potential damage to said device.

2. Target practice device of claim 1, wherein said motor means comprises:

a motor; and a shaft rotatably driven by said motor and about which said holder is mated; and wherein said couple means comprises a hub for fixedly coupling said holder to said shaft when the torque generated by said motor is lower than said predetermined torque.

3. Target practice device of claim 2, wherein said shaft has a slot and said hub has a groove corresponding to said slot, said hub further having two extending portions each releasably bolted to said holder such that said holder is synchronously rotatable with said hub, said target device further comprising:

a spline key slidably fitted into an aperture formed by the alignment of said slot and groove to thereby effectively causing said hub, and therefore said holder, to rotate in sync with said shaft.

4. Target practice device of claim 3, wherein said spline key is manufactured to have a tensile strength resistant to shear below said predetermined torque; and wherein said key will shear when the torque exerted on said key exceeds said predetermined torque so that said hub and said holder will no longer rotate in sync with said shaft.

5. Target practice device of claim 3, wherein said spline key comprises a malleable material able to withstand shearing up to said predetermined torque.

6. Target practice device of claim 3, wherein said spline key comprises lead.

7. Target practice device of claim 6, wherein said spline key comprises at least about 95% lead.

8. Target practice device of claim 3, wherein said spline key comprises lead and antimony.

9. Target practice device of claim 8, wherein said spline key comprises between about 0.45% to about 1.15% antimony.

10. Target practice device of claim 3, wherein said spline key comprises lead and silver.

11. Target practice device of claim 10, wherein said spline key comprises from about 0.42% to about 0.68% silver.

12. Target practice device of claim 3, wherein said spline key comprises lead and nickel.

13. Target practice device of claim 12, wherein said spline key comprises from about 0.20% to about 1.0% nickel.

14. Target practice device of claim 3, wherein said spline key comprises lead, antimony, arsenic, bismuth, silver, iron, cadmium and nickel.

15. Target practice device of claim 14, wherein said spline key comprises about 97%–98% lead, about 0.55%–1.05% antimony, about 0.022%–0.14% arsenic, about 0.007%–0.13% bismuth, about 0.52%–0.58% silver, about 0.03%–0.68% iron, about 0.011%–0.08% cadmium and about 0.30%–0.90% nickel.

16. Target practice device of claim 1, wherein said predetermined torque is between 40 to 50 lbs.

17. Target practice device of claim 3, wherein said spline key comprises at least about 94% zinc.

18. Target practice device of claim 3, wherein said spline key comprises zinc and antimony.

19. Target practice device of claim 3, wherein said spline key comprises zinc, antimony and aluminum.

20. Target practice device of claim 3, wherein said spline key comprises an 7000 Series Alloy.

21. Target practice device of claim 3, wherein said spline key comprises between about 94% to about 98% zinc.

22. Target practice device of claim 3, wherein said spline key comprises about 94%–98% zinc, about 0.55%–1.05% antimony, about 0.022%–0.14% arsenic, about 0.007%–0.13% bismuth, about 0.52%–0.58% silver, about 0.03%–0.68% iron, about 0.011%–0.08% cadmium, about 0.30%–0.90% nickel and about 0.01%–4.00% aluminum.

* * * * *